(12) United States Patent
Bair et al.

(10) Patent No.: US 8,271,932 B2
(45) Date of Patent: Sep. 18, 2012

(54) HIERARCHICAL ERROR INJECTION FOR COMPLEX RAIM/ECC DESIGN

(75) Inventors: Dean G. Bair, Bloomington, NY (US); Patrick J. Meaney, Poughkeepsie, NY (US); Luis A. Lastras-Montano, Cortlandt Manor, NY (US); Alia D. Shah, Poughkeepsie, NY (US); Eldee Stephens, Waterbury, CT (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 12/823,010

(22) Filed: Jun. 24, 2010

(65) Prior Publication Data

US 2011/0320872 A1    Dec. 29, 2011

(51) Int. Cl.
*G06F 11/22* (2006.01)
*G06F 17/50* (2006.01)

(52) U.S. Cl. ........ 716/136; 714/768; 714/769; 324/527; 324/537

(58) Field of Classification Search ............... 716/136; 714/6.2, 768, 798, E11.001; 324/527, 537, 324/500
See application file for complete search history.

(56) References Cited

U.S. PATENT DOCUMENTS

| | | |
|---|---|---|
| 2004/0225932 A1 | 11/2004 | Hoda et al. |
| 2007/0050740 A1 | 3/2007 | Jacobi et al. |
| 2009/0055682 A1 | 2/2009 | Gibson et al. |
| 2010/0005366 A1* | 1/2010 | Dell et al. ............ 714/758 |

* cited by examiner

*Primary Examiner* — Jack Chiang
*Assistant Examiner* — Brian Ngo
(74) *Attorney, Agent, or Firm* — Cantor Colburn LLP; John Campbell

(57) ABSTRACT

A computer-implemented method for verifying a RAIM/ECC design using a hierarchical injection scheme that includes selecting marks for generating an error mask, selecting a fixed bit mask based on the selected marks, determining whether to inject errors into at least one of a marked channel and at least one marked chip of a channel; and randomly injecting errors into the at least one of the marked channel and the at least one marked chip when determined.

21 Claims, 4 Drawing Sheets

| NEW Errors \ MARKS | No Marks | Single Chip Marked | Two Chips Marked | Channel Marked | Single Chip & Channel Marked | Double Chip and Channel Marked |
|---|---|---|---|---|---|---|
| None | GOOD | GOOD | GOOD | GOOD | GOOD | GOOD |
| 1 Chip/1 bit | CE | CE | CE | CE | CE | CE |
| 1 Chip/>1 bit | CE | CE | CE | CE | CE | UE |
| 2 Chips, Same Channel | CE | CE | CE | UE | UE | UE |
| 2 Chips, Different Channels | UE | UE | UE | UE | UE | UE |
| Full Channel Errors (CRC or other) | CE | CE | CE | UE | UE | UE |
| Special UE (SUE) | SUE | SUE | SUE | SUE | SUE | SUE |
| SUE with any of the above new errors | UE/SUE | UE/SUE | UE/SUE | UE | UE | UE |

Fig. 2

HIERARCHICAL ERROR INJECTION FOR COMPLEX RAIM/ECC DESIGN

BACKGROUND

The present invention relates to a complex RAIM/ECC design, and more specifically, to method for verifying a complex RAIM/ECC design using a hierarchical error injection scheme.

In a RAIM/ECC multi-channel design that has a large error state space it may be difficult to exhaustively verify the design within the limited time of a machine design cycle. Some ECC designs perform a verification process by randomly flipping a single bit to create correctable errors (CEs), and randomly flipping two or more bits to create uncorrectable errors (UEs) either in a memory location or on a data interface. The RAIM/ECC design has many other error states that requires a more sophisticated error injection scheme. In addition, only a fraction of the state space of bit flips that may result in a single error outcome, for example, a CE may be verified in an allotted time. Another verification scheme is a Reed-Solomon ECC verification scheme which creates patterns by randomly generating a set of test cases with specific parameters.

SUMMARY

According to an embodiment of the present invention, a computer-implemented method for verifying a RAIM/ECC design using a hierarchical injection scheme is provided. The method includes selecting marks for generating an error mask, selecting a fixed bit mask based on the selected marks, determining whether to inject errors into at least one of a marked channel and at least one marked chip of a channel; and randomly injecting errors into the at least one of the marked channel and the at least one marked chip when determined.

A computer program-product and system for performing the above-mentioned method is also provided.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 2 is a table that illustrates an example of a test matrix where different types of error failures including special uncorrectable errors (UEs) are able to be randomly generated and injected according to embodiments of the present invention.

DETAILED DESCRIPTION

Embodiments of the present invention disclose a hierarchical injection scheme which guides random injection to increase the probability of hitting corner cases, potential points of failure and major error states. By guiding the random injection, this injection scheme provides effective verification of a very large state space within a shorter time period than would be required by unbiased random bit flips alone. The hierarchical injection scheme according to an embodiment of the present invention may also be used to create test cases with particular error types and/or markings.

Figure 1:
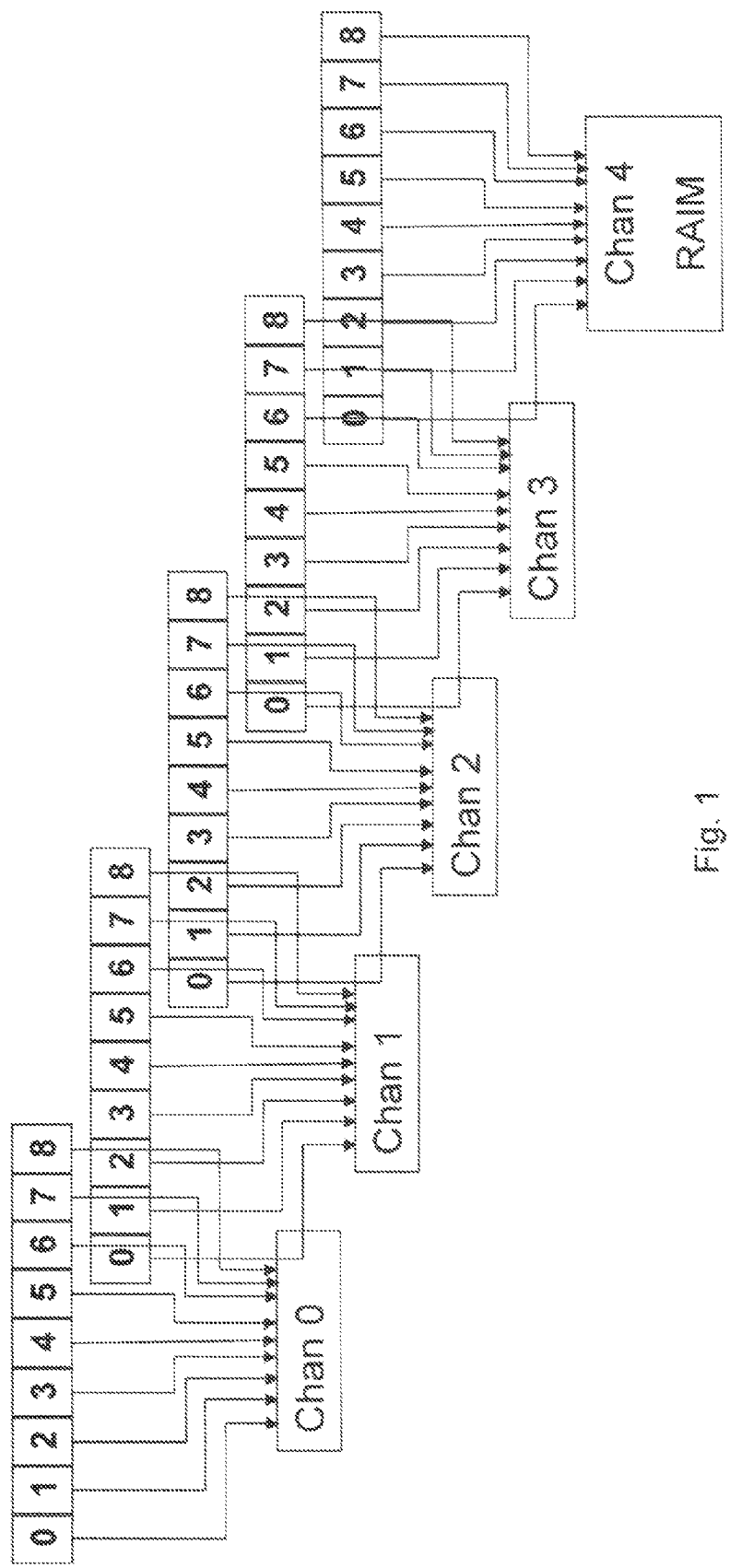
FIG. 1 is a block diagram illustrating a memory data organization for 64 bytes of data that can be implemented within embodiments of the present invention.

The hierarchical injection scheme according to an embodiment of the present invention is designed to operate on a 256 byte line of data. The 256 byte line is divided into 4 sections or quarter-lines (QL) each consisting of 64 bytes of data. There is a biasing table that controls which quarter-lines within the 256 byte line of data will be injected with new errors. The RAIM/ECC is designed to provide error detection and correction for 64 bytes of data. FIG. 1 is a block diagram illustrating a memory data organization for 64 bytes of data that can be implemented within embodiments of the present invention.

As shown in FIG. 1, a plurality of memory channels 0 through 4 are provided. A given 64 bytes of data (QL) and its associated RAIM/ECC information is spread across the five (5) channels (e.g., DIMMS). As used herein, the term "memory channel" or "channel" refers to a logical entity that is attached to a memory controller and which connects and communicates to one or more independent memory modules (each memory module consisting of one more memory devices, memory buffers, and/or registers physically grouped together). Thus, for example, in a cascaded memory module configuration a memory channel would comprise the connection means from a memory controller to a first memory module, the connection means from the first memory module to a second memory module, all intermediate memory buffers, etc.

Within each channel, for any 64 byte data transfer, the data is contained in nine chips with 16 bits coming from each chip. In total, the data and its associated RAIM/ECC information is contained within 90 bytes. The high order 16 bits in each channel are error correction code (ECC) bits. The rest of the bits in Channels 0 to 3 contain the data and channel 4 contains the RAIM data. An operation of randomly generating error failures will be discussed below with reference to FIG. 2.

FIG. 2 is a table that illustrates an example of a test matrix where different types of error failures including special uncorrectable errors (SUEs) are able to be randomly generated and injected into the system. The present invention is not limited to the text matrix 200 shown in FIG. 2 and may vary accordingly. As shown in FIG. 2, the test matrix 200, there are several different types of error failures that may be injected into the system. For example, there are specific errors for single marked chips, two marked chips, a marked channel, single chip and marked channel and double chip and marked channel. According to the text matrix 200 provided, new chip errors are only on unmarked chips and unmarked channels. Further new channel errors are only on unmarked channels. In addition, the chip marks are based on rank while the channel mark is independent of rank. The test matrix 200 indicates the error cases that the hierarchical injection method is intended to cover. The top portion of the matrix 200, indicating the various marking cases that need to be tested, is targeted by the random selection of the marks as one layer in the hierarchy. Errors within the marked chips and/or channel are not detected as errors but the data is corrected, as long as errors injected outside of the marking do not result in a UE/SUE. Thus, another layer creates the errors to be injected on the marked chips and/or channel. The left most column in the test matrix 200, excluding the SUE, indicates the new error types that need to be tested. Yet another layer in the hierarchy selects one of the new error types to be tested, and the final layer generates the individual bit flip masks for each chip to generate the selected error type. By combining the randomly selected layers, test cases are able to be created to cover all of the cases indicated in the test matrix 200. Testcases to cover the SUE portion of the matrix 200 are created by randomly combining the testcases generated by the method indicated above with a SUE, which is selected in one of the layers of the hierarchy.

Figure 3:
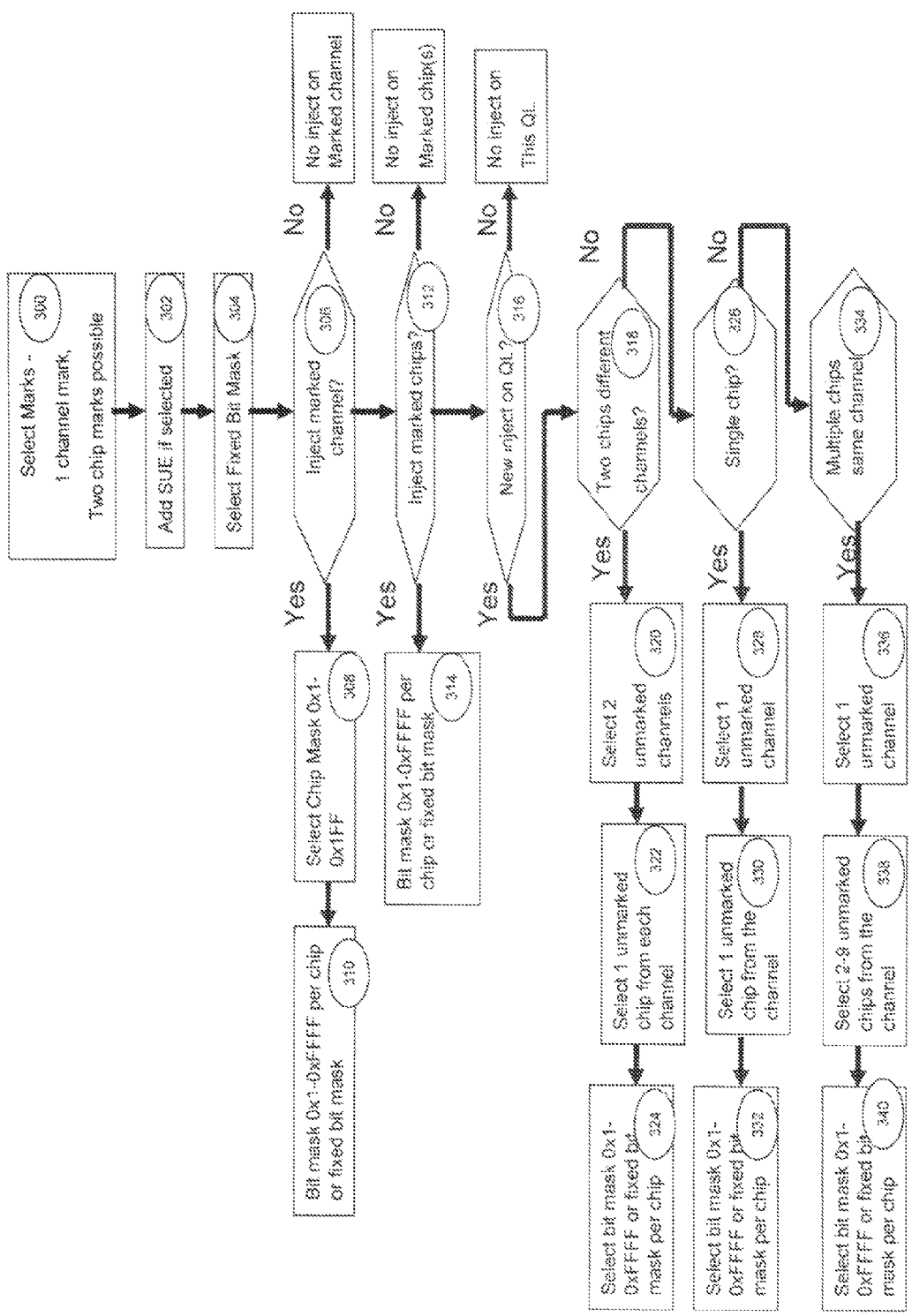
FIG. 3 is a flowchart illustrating a hierarchical injection method implemented via a computer that can be implemented within embodiments of the present invention.

FIG. 3 is a flowchart illustrating a hierarchical injection method that can be implemented within embodiments of the present invention. As shown in FIG. 3, the process begins at operation 300, where marks are selected for generating an error mask. According to an embodiment of the present invention, any combination of one channel mark and/or two chip marks maybe selected for generating an error mask. From operation 300, the process continues to operation 302 where it is determined whether a special uncorrected error (SUE) is selected for injection. If so, then the process continues to operation 304 where a fixed bit mask is selected, to be used in the remaining steps.

From operation 304, the process continues to operation 306 where it is determined whether to inject error(s) into the marked channel. If so, the process continues to operation 308 where a chip mask is selected which will be used to control which chips within the channel will be injected. The selection of the number of chips to inject is controlled by a biasing table that ensures that the minimum case of one chip will be selected a certain percentage of the time, that the maximum of all 9 chips will be selected a certain percentage of the time, and the remainder of the time the number of chips selected is equally distributed from 1 to 9. Once the number of chips to inject is determined, then the specific chips to be injected are also randomly selected. From operation 308, the process continues to operation 310 where a random bit flip mask or the fixed bit flip mask is selected for each chip selected for injection. Both the random bit flip masks and the fixed bit flip mask are generated using a biasing table that will generate a mask with a single bit flip a specified percentage of the time, a mask that will flip all the bits on the chip a specified percentage of the time, or will randomly select between 1 and 16 bit flips the remaining percentage. The specific bit locations to be flipped are randomly selected from among the 16 possible locations, once the number of bit flips has been determined. Next, in operation 312, it is determined whether to inject marked chips. If so, the process continues to operation 314 where a random bit flip mask or the fixed bit flip mask is selected for each marked chip.

From operation 314, the process continues to operation 316 where it is determined whether to inject new errors in the data on unmarked chips and/or channels. If it is determined to inject new errors, the process continues to operation 318 where it is determined whether to inject two chips on different channels, for example. If so, the process continues to operation 320, where two unmarked channels are selected. From operation 320, the process continues to operation 322 where 1 unmarked chip from each channel is selected. From operation 322, the process continues to operation 324 where a random bit flip mask or the fixed bit mask is chosen for each chip selected.

If it is determined in operation 318, not to inject two chips on different channels, the process continues to operation 326 wherein it is determined whether to inject on a single chip. If so, the process continues to operation 328 where one unmarked channel is selected. From operation 328, the process continues to operation 330 where one unmarked chip from the channel is selected. Then, from operation 330, the process continues to operation 332, where a random bit flip mask or the fixed bit is selected for the chip.

If it is determined in operation 326, not to inject a single chip, the process continues to operation 334 where it is determined to inject multiple chips from the same channel. The process then moves to operation 336 where one unmarked channel is selected. From operation 336, the process moves to operation 338 where a chip mask is generated which will be used to control which unmarked chips within the channel will be injected. The selection of the number of chips to inject is controlled by a biasing table that ensures that the minimum case of two chips will be selected a certain percentage of the time, that the maximum of all 9 chips will be selected certain percentage of the time, and the remainder of the time the number of chips selected is equally distributed from 2 to 9. Once the number of chips to inject is determined, then specific chips to be injected are also randomly selected. From operation 338, the process continues to operation 340 where a random bit flip mask or the fixed bit mask is selected per chip. The injection scheme shown in FIG. 3 covers the major categories within the text matrix shown in FIG. 2. Biasing tables are used to control the generation of specific error types. Therefore, chip masks and bit flip masks and the re-use of a fixed bit mask allow corner cases and suspected weaknesses in the RAIM/ECC design to be covered. Further, according to an embodiment of the present invention, the injection of a SUE may also be selected in conjunction with or in the absence of other errors.

Thus, the present invention provides several advantages including targeting of suspected weaknesses in a design having a very large state space to verify, which allows errors to be uncovered without exhaustively verifying the entire state space and generating test cases that will transverse the entire scope of a complex error test matrix. Further, the present invention also is able to test extremes of single bit/single chip fails and all bits/all chips fails.

Figure 4:
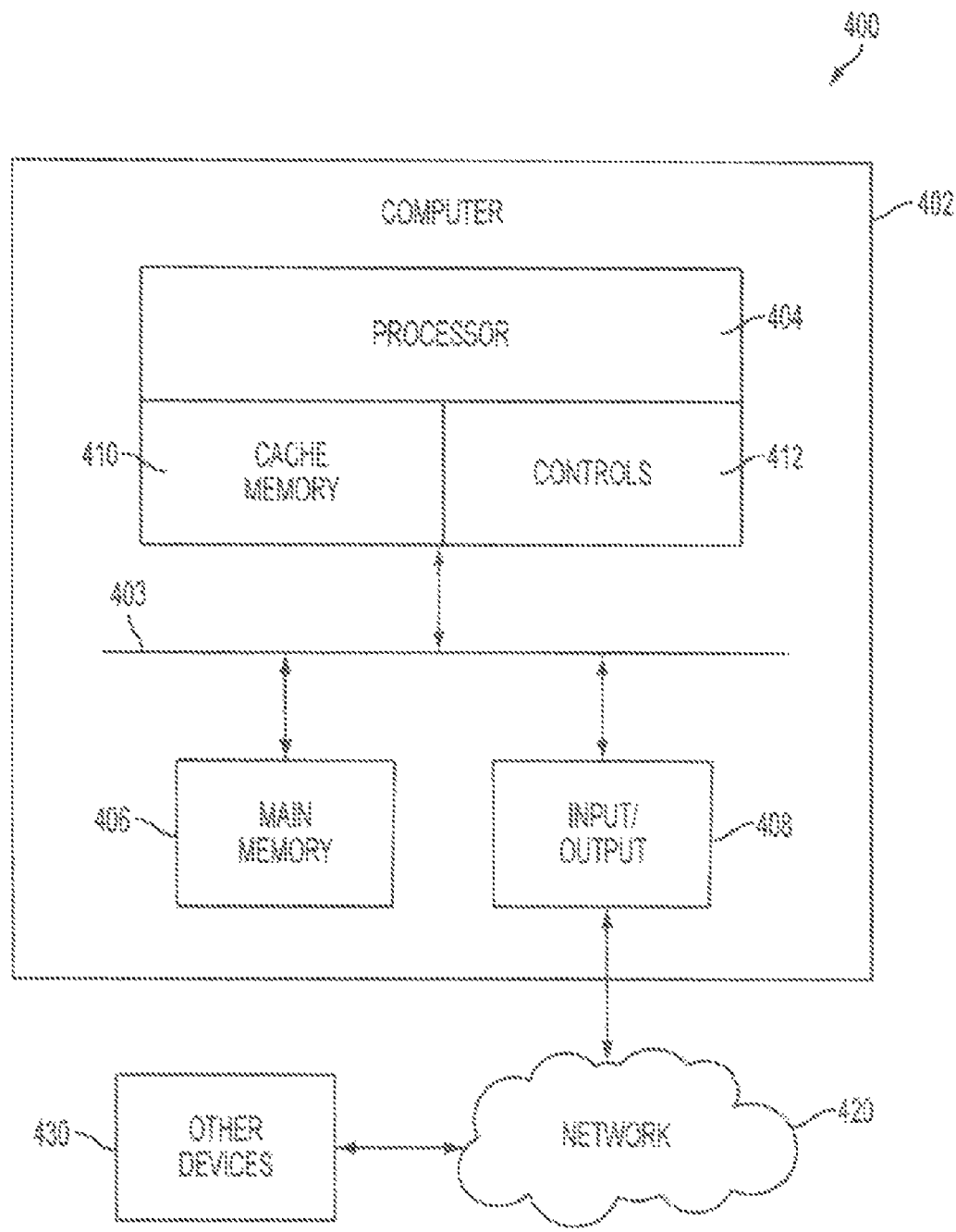
FIG. 4 is a block diagram illustrating a computer system that can be implemented within embodiments of the present invention.

FIG. 4 is an example of a computer system configured for implemented the above-mentioned method shown in FIG. 3 according to embodiments of the present invention. The computer system 400 includes a computer 402, a network 420 and other components 430. The computer 402 and other components 430 are in communication with each other via the network 420. The computer 402 includes a processor 404, main memory 406, and input/output components 408 which are in communication via a bus 403. Processor 404 includes cache memory 410 and controls 412, which include components configured for implemented the method described in the flowchart shown in FIG. 3. The cache 410 may include multiple levels that are on or off-chip from processor 404. Memory 406 may include various data stored therein, e.g., instructions, software, routines, etc., which may be transferred to/from the cache 410 by controls 412 for execution by the processor 404. Input/output components 408 may include one or more components that facilitate local and/or remote input/output operations to/from computer 402 such as a display, keyboard, modem, network adapter, etc. (not depicted).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

The flowcharts can be implemented by computer program instructions. These computer program instructions may be provided to a processor (element 404 as depicted in FIG. 4, for example) or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for verifying a RAIM/ECC design using a hierarchical error injection scheme, the method comprising:
    selecting marks for generating an error mask, the marks corresponding to at least one of: a marked channel and at least one marked chip;
    selecting a fixed bit flip mask based on the selected marks;
    determining that errors should be injected into the at least one of the marked channel and the at least one marked chip;
    randomly injecting, by a computer, errors into the at least one of the marked channel and the at least one marked chip based on the determining that the errors should be injected into the at least one of the marked channel and the at least one marked chip, the injecting based on at least one of the fixed bit flip mask and a random bit flip mask;
    determining that errors should be injected into an unmarked chip; and
    based on the determining that errors should be injected into an unmarked chip:
        selecting an unmarked channel;
        selecting an unmarked chip from the unmarked channel; and
        selecting the random bit flip mask or the fixed bit flip mask for the selected unmarked chip.

2. The computer-implemented method of claim 1, further comprising:
    determining whether to inject a special uncorrectable error based determining that errors should be injected into the at least one of the marked channel and the at least one marked chip.

3. The computer-implemented method of claim 1, wherein the randomly injecting errors into the marked channel comprises:
    selecting a chip mask to control which chips within the marked channel are to be injected with errors; and
    selecting the random bit flip mask or the fixed bit flip mask for each chip within the marked channel to be injected with errors.

4. The computer-implemented method of claim 1, wherein the randomly injecting errors into the at least one marked chip comprises:
    selecting the random bit flip mask or the fixed bit flip mask for the at least one marked chip.

5. The computer-implemented method of claim 1, further comprising:
    determining whether to inject errors into multiple unmarked chips on different channels;
    and
    determining whether to inject errors into multiple unmarked chips from a same channel.

6. The computer-implemented method of claim 5, wherein based on determining to inject errors into multiple unmarked chips on different channels, the method further comprises:
    selecting at least two unmarked channels;
    selecting one unmarked chip from each of the at least two unmarked channels selected; and
    selecting the random bit flip mask or the fixed bit flip mask for the selected unmarked chips.

7. The computer-implemented method of claim 5, wherein based on determining to inject errors into multiple chips from a same channel, the method further comprises:
    selecting one unmarked channel;
    selecting at least two unmarked chips from the unmarked channel; and
    selecting the random bit flip mask or the fixed bit flip mask for each of the at least two unmarked chips.

8. A computer-program product for verifying a RAIM/ECC design using a hierarchical error injection scheme, the computer program product comprising:
    a tangible storage medium readable by a processing circuit and storing instructions for execution by the processing circuit for performing a method comprising:
        selecting marks for generating an error mask, the marks corresponding to at least one of: a marked channel and at least one marked chip;

selecting a fixed flip bit mask based on the selected marks;
determining that errors should be injected into the at least one of the marked channel and the at least one marked chip; and
randomly injecting errors into the at least one of the marked channel and the at least one marked chip based on the determining that the errors should be injected into the at least one of the marked channel and the at least one marked chip, the injecting based on at least one of the fixed bit flip mask and a random bit flip mask;
determining that errors should be injected into an unmarked chip; and
based on the determining that errors should be injected into an unmarked chip:
selecting an unmarked channel;
selecting an unmarked chip from the unmarked channel; and
selecting the random bit flip mask or the fixed bit flip mask for the selected unmarked chip.

9. The computer-program product of claim 8, wherein the method further comprises:
determining whether to inject a special uncorrectable error based upon determining that errors should be injected into the at least one of the marked channel and the at least one marked chip.

10. The computer-program product of claim 8, wherein the randomly injecting errors into the marked channel comprises:
selecting a chip mask to control which chips within the marked channel are to be injected with errors; and
selecting the random bit flip mask or the fixed bit flip mask for each chip within the marked channel to be injected with errors.

11. The computer-program product of claim 8, wherein the randomly injecting errors into the at least one marked chip comprises:
selecting the random bit flip mask or the fixed bit flip mask for the at least one marked chip.

12. The computer-program product of claim 8, wherein the method further comprises:
determining whether to inject errors into multiple unmarked chips on different channels; and
determining whether to inject errors into multiple unmarked chips from a same channel.

13. The computer-program product of claim 12, wherein based on determining to inject errors into multiple unmarked chips on different channels, the method further comprises:
selecting at least two unmarked channels;
selecting one unmarked chip from each of the at least two unmarked channels selected; and
selecting the random bit flip mask or the fixed bit flip mask for the selected unmarked chips.

14. The computer-program product of claim 12, wherein based on determining to inject errors into multiple chips from the same channel, the method further comprises:
selecting one unmarked channel;
selecting at least two unmarked chips from the unmarked channel; and
selecting the random bit flip mask or the fixed bit flip mask for each of the at least two unmarked chips.

15. A system for verifying a RAIM/ECC design using a hierarchical error injection scheme, the system comprising:
a processor coupled with a controller;
the system configured to perform a method, the method comprising:

selecting marks for generating an error mask, the marks corresponding to at least on of: a marked channel and at least one marked chip;
selecting a fixed bit flip mask based on the selected marks;
determining that errors should be injected into the at least one of the marked channel and the at least one marked chip
randomly injecting errors into the at least one of the marked channel and the at least one marked chip based on the determining that the errors should be injected into the at least one of the marked channel and the at least one marked chip, the injecting based on at least one of the fixed bit flip mask and a random bit flip mask;
determining that errors should be injected into an unmarked chip; and
based on the determining that errors should be injected into an unmarked chip:
selecting an unmarked channel;
selecting an unmarked chip from the unmarked channel; and
selecting the random bit flip mask or the fixed bit flip mask for the selected unmarked chip.

16. The system of claim 15, wherein the method further comprises:
determining whether to inject a special uncorrectable error based on determining that errors should be injected into the at least one of the marked channel and the at least one marked chip.

17. The system of claim 15, wherein the randomly injecting errors into the marked channel comprises:
selecting a chip mask to control which chips within the marked channel are to be injected with errors; and
selecting the random bit flip mask or the fixed bit flip mask for each chip within the marked channel to be injected with errors.

18. The system of claim 15, wherein the randomly injecting errors into the at least one marked chip comprises:
select the random bit flip mask or the fixed bit flip mask for the at least one marked chip.

19. The system of claim 15, wherein the method further comprises:
determining whether to inject errors into multiple unmarked chips on different channels; and
determining whether to inject errors into multiple unmarked chips from a same channel.

20. The system of claim 19, wherein based on determining to inject errors into multiple unmarked chips on different channels, the method further comprises:
selecting at least two unmarked channels;
selecting one unmarked chip from each of the at least two unmarked channels selected; and
selecting the random bit flip mask or the fixed bit flip mask for the selected unmarked chips.

21. The system of claim 19, wherein based on determining to inject errors into multiple chips from a same channel, the method further comprises:
selecting one unmarked channel;
selecting at least two unmarked chips from the unmarked channel; and
selecting the random bit flip mask or the fixed bit flip mask for each of the at least two unmarked chips.

* * * * *